Nov. 26, 1929.  G. A. PAGE, JR  1,737,123

DUMP VALVE FOR FLUID CONTAINERS

Filed Feb. 10, 1927

INVENTOR
GEORGE A. PAGE, JR.
BY
ATTORNEY

Patented Nov. 26, 1929

1,737,123

UNITED STATES PATENT OFFICE

GEORGE A. PAGE, JR., OF FREEPORT, NEW YORK, ASSIGNOR TO CURTISS AEROPLANE & MOTOR COMPANY, INC., A CORPORATION OF NEW YORK

DUMP VALVE FOR FLUID CONTAINERS

Application filed February 10, 1927. Serial No. 167,260.

My invention relates to gate or dump valves for fluid containers.

In aircraft, for instance, it is often desirable to empty the fuel tank thereof if and when a forced landing is inevitable. By doing so all fire hazard in the event of a smash-up is eliminated. The usual practice, in this connection, is to either shed the fuel tank clear of the machine, or, where shedding is impractical to provide in the tank wall a rip panel by means of which it (the fuel tank) can be quickly opened up and its contents quickly emptied.

Now it frequently happens that notwithstanding a forced landing, the aircraft is in no way damaged or impaired. Such a machine, if its fuel tank be neither shed nor ripped, might very readily upon refilling again proceed on its way. If, however, the fuel tank is shed or ripped, further flight cannot possibly be made until either the shed tank is replaced by a new tank or the ripped tank is properly repaired.

An object of the present invention is to so form and construct an aircraft fluid tank or container that in an emergency its entire contents may be rapidly and completely dumped without injury to or the loss of any part or portion of the tank. That this may be accomplished a novel form of gate or dump valve is provided.

A further object of the invention is to so form and construct the gate or dump valve as to initiate the opening movement thereof in one and the same movement as that required for its release.

Other objects and advantages of the invention will be hereinafter set forth.

In the drawings, wherein like reference characters denote like or corresponding parts.

Figure 1:
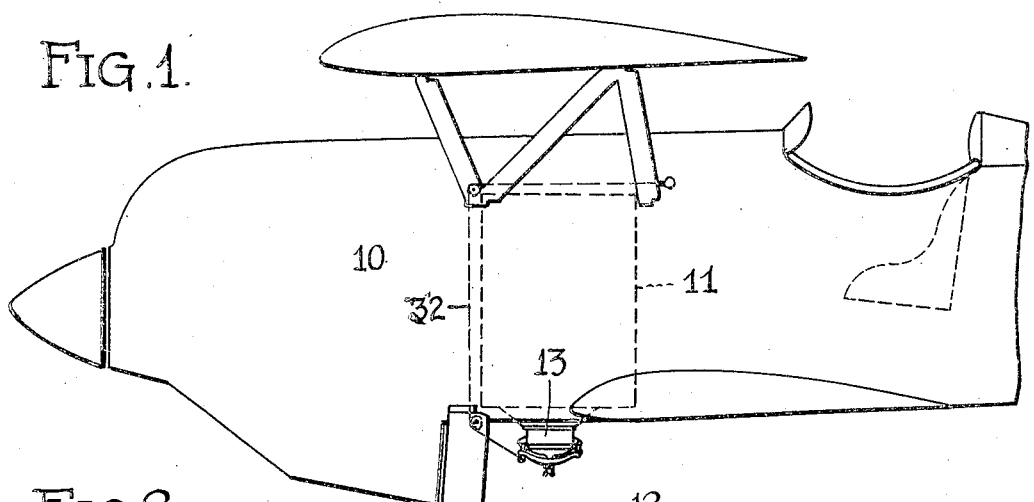
Fig. 1 is a side elevation of an aeroplane having installed therein a fuel tank and said fuel tank being provided with a gate or dump valve operable from the pilot's seat.

In the embodiment of the invention selected for illustration an aeroplane of more or less conventional design is shown. Within the body 10 of said aeroplane a fuel tank or container 11 is enclosed. On its underside, said tank 11 has formed therein an opening 12 over which a base portion 13 is fitted. Said base portion 13 (see Fig. 2) is substantially cylindrical and has formed thereon, at the bottom thereof, an annular shoulder 14 constituting a seat. Normally said bottom opening 12 is closed by a suitable cover-plate or closure 15, marginally flanged as indicated at 16 to bear firmly against a suitable gasket 17 interposed between said shoulder 14 and said flange.

The cover plate 15 is held in place firmly against said seat or shoulder 14 by means of an adjustable screw 18 which, at its inner or upper end, bears firmly against the head 19 of a screw 20 carried by said cover-plate and centrally disposed with respect thereto. As indicated in said Fig. 2 the head portion 19 of the screw 20 may have formed therein a recess 21 within which the inner end portion of the adjustable screw 18 engages. Said screw 18 is carried by a bail member 22 which is pivoted at one end as indicated at 23 to a link 24 in turn pivoted as at 25 to a lug 26 formed upon the base portion 13 of the tank. At its opposite end said bail member 22 is bifurcated at 27 to straddle a pin 28 carried by the release lever 29 by means of which said bail 22 is released. Said release lever 29 is pivoted as at 30 to a lug 31 formed upon said base portion diametrically opposite to the lug 26. By means of said release lever 29 the bail 22 is held in that position providing for the cover-plate 15 a suitable support.

Figure 2:
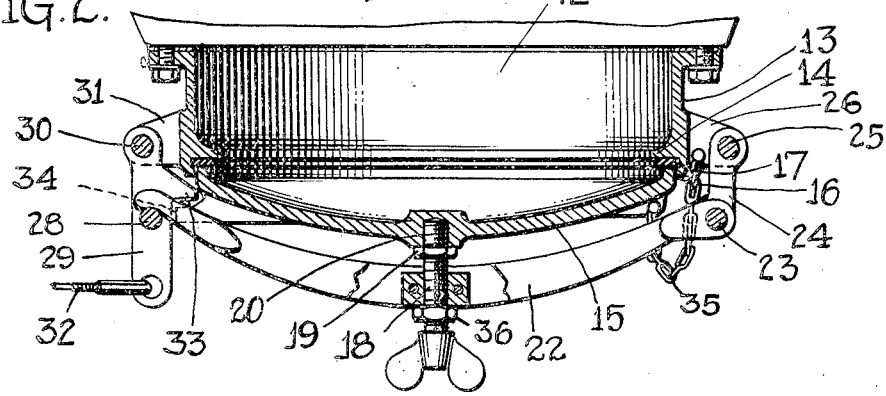
Fig. 2 is a transverse vertical sectional view of the gate valve and that part or portion of the fuel tank or container in the immediate vicinity thereof and, Fig. 3 is an inverted plan view of said valve.
Figure 3:
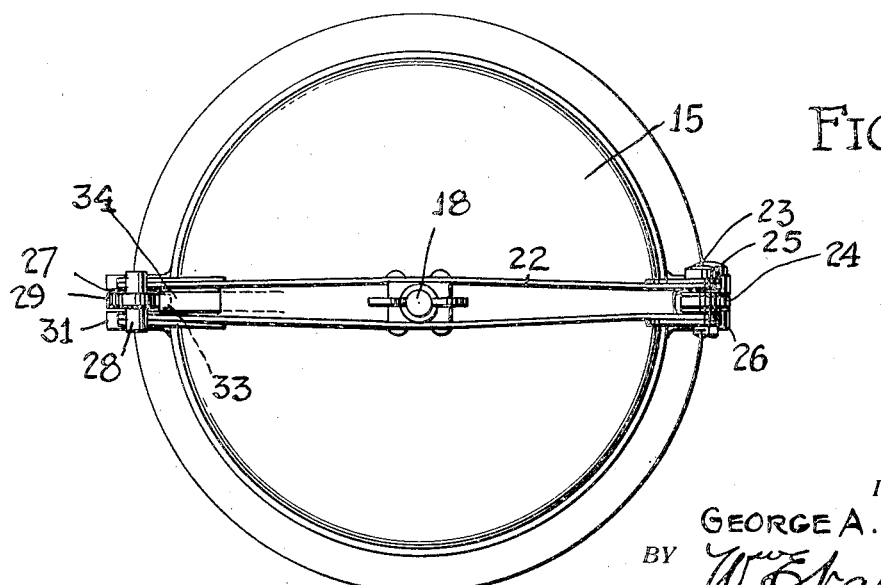

With the bail 22 and the closure or cover-plate 15 positioned as indicated in Fig. 2, the opening 12 formed in the tank bottom is effectually sealed. To release said cover-plate, and hence quickly empty the tank 10 of its fluid contents, it is but necessary to exert on the release lever 29 a pull of sufficient force to withdraw the pin 28 out of engagement with the free or bifurcated end of the bail. That this may be conveniently accomplished said release lever 29 has attached thereto an operating cord 32, which cord, at its opposite end, is carried to a point within easy reach of the pilot.

Since it is intended that the closure 15 shall be opened up only in the event of an emergency, means is provided to initiate such opening movement simultaneously with the bail release. Such means comprises a lug 33 formed upon the release lever 19 and a lug 34 formed upon the underside of said cover-plate. In the normal or locked position of the cover-plate, said two lugs 33 and 34 overlap, the lug 33 being extended over and beyond the outer end of the lug 34 with the adjacent faces or edges of the two lugs in spaced relation. With the lugs thus positioned the release lever 29 may be swung sufficiently about its pivot 30 to withdraw the pin 28 from engagement with the bail end before said lugs are brought into bearing contact. With the continued movement of said release lever in the same direction, the lugs 33 by its bearing engagement on the lug 34 forces the cover-plate or closure 15 downwardly; this movement of the cover-plate breaking its contact with the seat or shoulder 14 and permitting the bail and said cover-plate to fall freely away from the tank. To prevent the loss of said cover-plate when released in the manner indicated a chain or other flexible connection 35 is provided. The ends of said chain are fastened respectively to the lug 26 and to said cover-plate as indicated. If desired, a locknut 36 may be threaded on the adjusting screw 18 to lock and hold said screw in its adjusted position.

A gate or dump valve characterized as above set forth is advantageous in that a perfect seal at the opening 12 in the tank is provided. By swinging said cover-plate until its annular flange is in bearing contact with the seat or shoulder 14 and tightening the screw 18 against it all possibility of leakage in and around the gasket 17 is eliminated. With the tank opening thus sealed the contents of the tank cannot be dumped so long as the bail 22 remains locked. To release the bail, and hence the cover-plate, it is only necessary to withdraw the release lever 29 until the pin 28 thereof is swung from beneath the bail end. Moreover, since none of the tank parts are lost in a dumping operation, it (the tank) may be refilled and the gate valve again closed to effectually seal the tank opening.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an aeroplane, the combination with the body thereof, a fuel tank enclosed within said body directly above an opening formed in the body wall, and a seat for an occupant; of a sump formed on said tank and provided with a discharge opening, said sump being carried at its bottom end thru said body opening, a closure for said tank opening a release means for said closure operable from a point in proximity to said seat, to dump in an emergency, the fluid contents of said tank, and a tie connection for preventing the loss of said closure during and after its release.

2. The combination, in an aeroplane, of a fluid container having formed in its underside an opening, a dump valve for said container including a closure for said opening, and a releasable bail carried beneath and across said closure, means carried by said bail and adjustable in its relation to said closure for holding said closure firmly in place over said opening, a release lever mounted at one side of said opening to engage with and hold said bail beneath said closure, means operable as said release lever is tripped to engage with and initiate the opening movement of said closure, and means independent of the bail for supporting said closure after its release.

In testimony whereof I hereunto affix my signature.

GEORGE A. PAGE, Jr.